United States Patent
Lu (10) Patent No.: US 7,726,924 B2
(45) Date of Patent: Jun. 1, 2010

(54) CONNECTING STRUCTURE FOR CONNECTING METAL ELEMENTS AND METHOD USING THE SAME

(75) Inventor: Xiu-Qing Lu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 39 days.

(21) Appl. No.: 11/946,851

(22) Filed: Nov. 29, 2007

(65) Prior Publication Data

US 2008/0289143 A1 Nov. 27, 2008

(30) Foreign Application Priority Data

May 25, 2007 (CN) .......................... 2007 1 0200707

(51) Int. Cl.
*F16B 21/07* (2006.01)
(52) U.S. Cl. ....................................... 411/171; 411/553
(58) Field of Classification Search ................. 411/171, 411/533, 553; 403/408.1, 270
See application file for complete search history.

(56) References Cited

U.S. PATENT DOCUMENTS

| 2,167,285 | A | * | 7/1939 | Smith | 403/270 |
|---|---|---|---|---|---|
| 2,202,405 | A | * | 5/1940 | Smith | 219/107 |
| 2,583,868 | A | * | 1/1952 | Mociun | 219/107 |
| 3,045,736 | A | * | 7/1962 | Howe | 411/171 |
| 3,449,004 | A | * | 6/1969 | Anderson | 403/408.1 |
| 4,281,786 | A | | 8/1981 | Krueger | |
| 4,468,161 | A | * | 8/1984 | Krueger | 411/171 |
| 5,716,180 | A | * | 2/1998 | Bowers | 411/551 |
| 6,755,601 | B2 | * | 6/2004 | Ohta | 411/171 |

FOREIGN PATENT DOCUMENTS

| DE | 3920956 A1 | 10/1990 |
|---|---|---|
| TW | 584701 | 4/2004 |

* cited by examiner

*Primary Examiner*—Gary Estremnsky
(74) *Attorney, Agent, or Firm*—Frank R. Niranjan (57) ABSTRACT

An exemplary connecting structure (30), for connecting a first metal element (31) and a second metal element (32), includes a threaded weld bushing (34) and a fastener (36). The threaded weld bushing includes a main body (340) for being spot welded to the first metal element with a plurality of weld joints, and a collar (342) extending from one end of the main body for abutting the first metal element and connecting to the second metal element, and a fastener latching portion (346) defined in the main body and the collar. The fastener is configured for engaging with the fastener latching portion so as to prevent the second metal element detaching from the threaded weld bushing.

8 Claims, 9 Drawing Sheets

CONNECTING STRUCTURE FOR CONNECTING METAL ELEMENTS AND METHOD USING THE SAME

BACKGROUND OF THE INVENTION

1. Field of the Invention

The present invention generally relates to connecting structures and methods for using the same, and more particularly, to a connecting structure used for connecting metal elements and a method using the same.

2. Discussion of the Related Art

Figure 8:
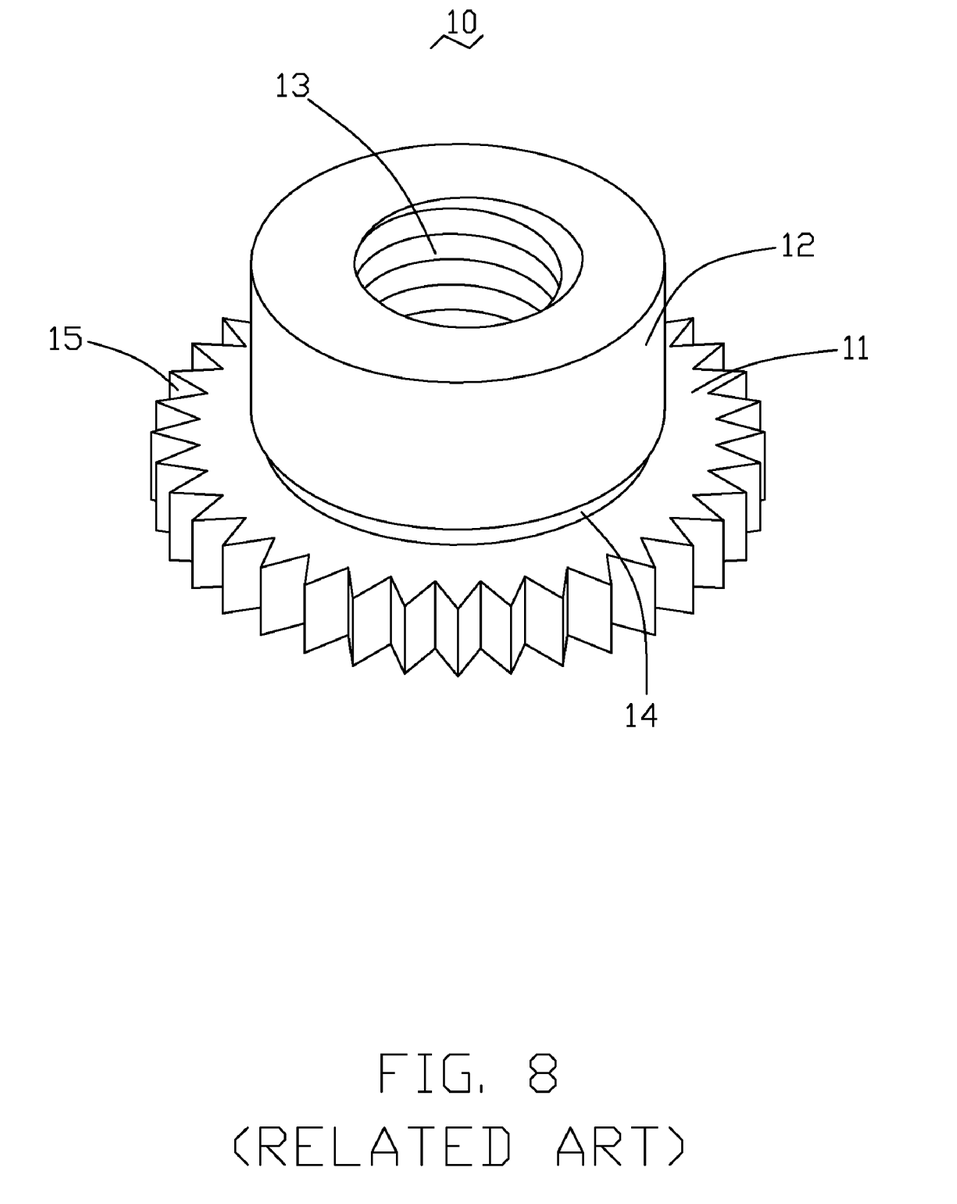
FIG. 8 is an isometric view of a conventional rivet.

Rivets are generally used as connecting structures to connect metal elements together. Referring to FIG. 8, a typical rivet 10 is shown. The rivet 10 is used for connecting a first metal element (not shown) and a second metal element (not shown) together. The rivet 10 includes a collar 11 and a cylindrical portion 12 extending from one end of the collar 11. The collar 11 is gear-shaped and includes a plurality of gear teeth 15. The rivet 10 defines a threaded hole 13 through the cylindrical portion 12 and the collar 11. The rivet 10 defines an annular groove 14 at an end of the cylindrical portion 12 adjoining the collar 11.

To use the rivet 10, the collar 11 of the rivet 10 is pressed into a first corresponding through hole of the first metal element, thus the gear teeth 15 of the collar 11 is inserted into the first metal element and part of the materials of the first metal element are displaced into the annular groove 14 of the rivet 10. Therefore, the collar 11 of the rivet 10 can be tightly engaged in the first through hole of the first metal element. The cylindrical portion 12 of the rivet 10 is received in a second corresponding through hole of the second metal element and a screw (not shown) engages in the threaded hole 13 of the rivet 10. Thus the first metal element and the second metal element are joined together.

Figure 9:
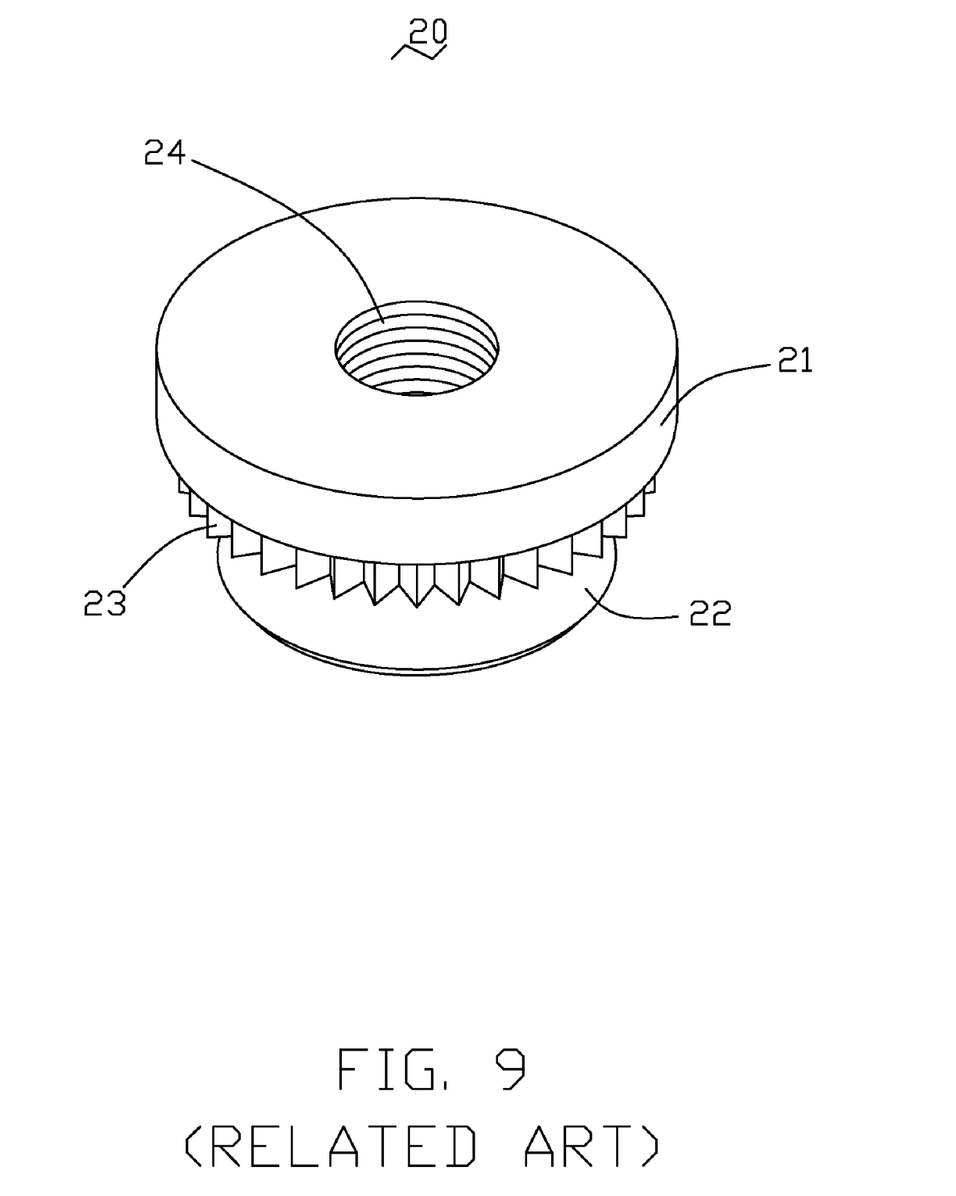
FIG. 9 is an isometric view of another conventional rivet.

Referring to FIG. 9, another typical rivet 20 is shown. The rivet 20 includes a collar 21, a shaft portion 22, and a gear-shaped portion 23. The gear-shaped portion 23 is disposed between the collar 21 and the shaft portion 22. The collar 21 is cylindrical. The shaft portion 21 is a frustum of a cone, thus one end of shaft portion 21 is smaller the other end of the shaft portion 21. The smaller end of the shaft portion 21 is connected to one end of the middle portion 23. The rivet 20 defines a threaded hole 24 through the collar 21, the shaft portion 22, and the gear-shaped portion 23.

To use the rivet 20, the first through hole of the fist metal element corresponds to the gear-shaped portion 23 of the rivet 20 and the second through hole of the second metal element corresponds to a larger end of the shaft portion 22. The larger end of the shaft portion 22 of the rivet 20 is pressed into the first through hole of the first metal element, thus the gear-shaped portion 23 of the rivet 20 is inserted into the first metal element and part of the materials of the first metal element are extruded to cover the shaft portion 22. Therefore, the shaft portion 22 of the rivet 20 can be tightly engaged in the first through hole of the first metal element. The collar 21 of the rivet 20 is received in the second through hole of the second metal element and a screw (not shown) engages in the threaded hole 24 of the rivet 20. Thus the first metal element and the second metal element are joined together.

However, if a thickness of the first metal element and the second metal element is less than 0.8 millimeters, the strength produced by the rivets 1020 for bonding the first metal element and the second metal element will be unduly small, thus the above described rivets 10, 20 are not acceptable when joining such metal elements together. In addition, if a hardness of the first metal element and a hardness of the second metal element are both larger than 90 on the Rockwell Hardness B scale (HRB), the threaded holes 13, 24 of the rivets 10, 20 are easily destroyed by the first metal element and the second metal element, thus the rivets 10, 20 are not the preferred means of joining such metal elements together.

Therefore, a new connecting structure is desired in order to overcome the above-described shortcomings. A method for using the connecting structure to connect metal elements is also desired.

SUMMARY

In one aspect, a connecting structure, for clamping a first metal element with a second metal element, includes a threaded weld bushing and a fastener. The threaded weld bushing includes a main body for being spot welded to the first metal element with a plurality of weld joints, and a collar extending from one end of the main body for abutting the first metal element and connecting to the second metal element, and a fastener latching portion defined in the main body and the collar. The fastener is configured for engaging with the fastener latching portion so as to prevent the second metal element detaching from the threaded weld bushing.

In another aspect, a method for connecting metal elements includes: providing a connecting structure, the connecting structure including a threaded weld bushing and a fastener, the threaded weld bushing including a main body, a collar extending from one end of the main body, and fastener latching portion defined in the main body and the collar; providing a first metal element defining first through hole, the first through hole receiving the main body, and the collar abutting the first metal element; welding the main body to the main body with a plurality of weld joints; providing a second metal element defining second through hole, and the second through hole receiving the collar of the threaded weld bushing; and the fastener latching portion of the connecting structure engaging with the fastener so as to prevent the second metal element detaching from the connecting structure.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present connecting structure and method. Moreover, in the drawings, like reference numerals designate corresponding parts throughout the several views, and all the views are schematic.

DETAILED DESCRIPTION OF THE EMBODIMENTS

Reference will now be made to the drawings to describe preferred embodiments of the present connecting structure (and method) in detail.

Figure 1:
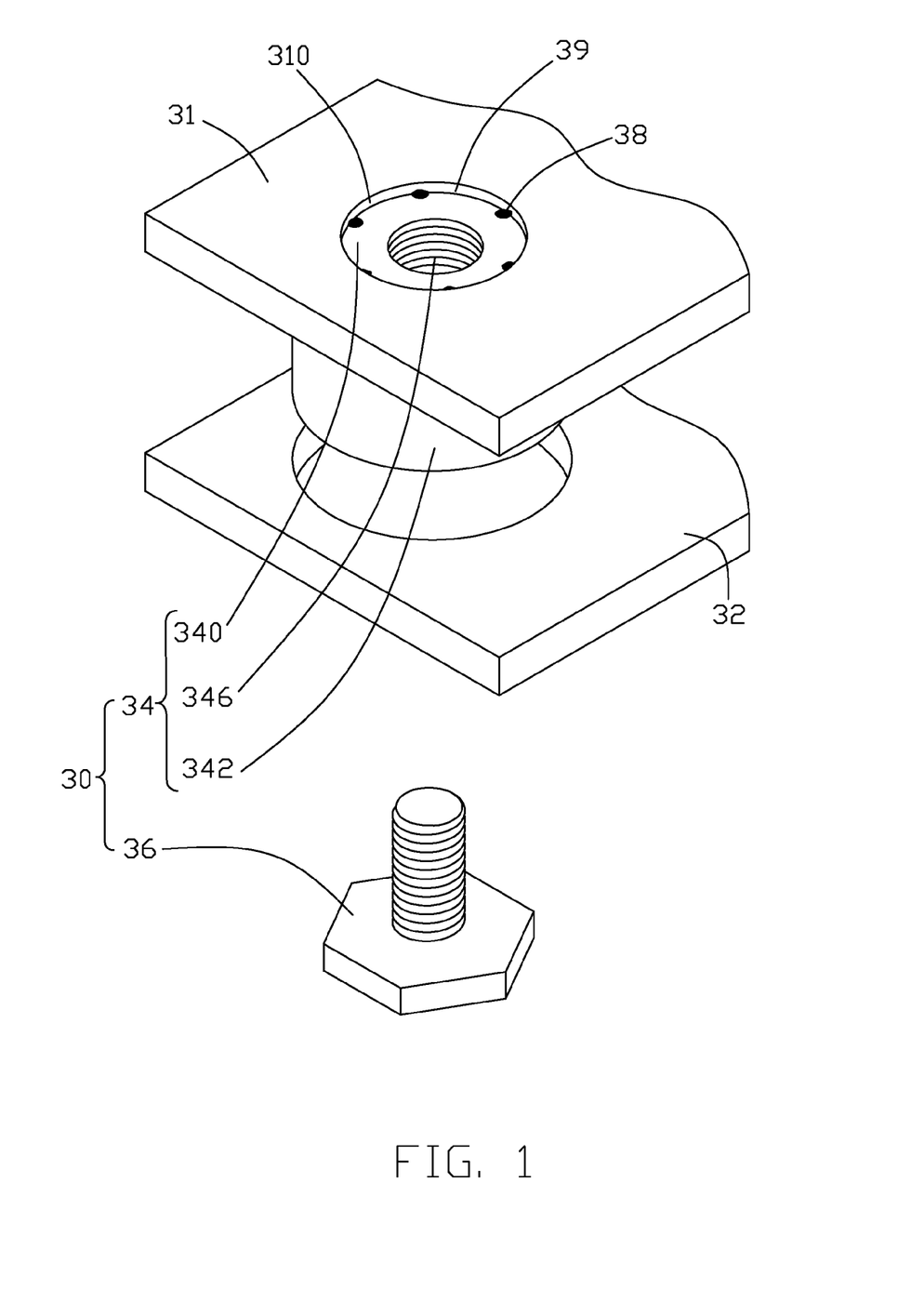
FIG. 1 is a partially exploded, isometric view of a connecting structure in accordance with a first preferred embodiment of the present invention, and with a first metal element and a second metal element.
Figure 2:
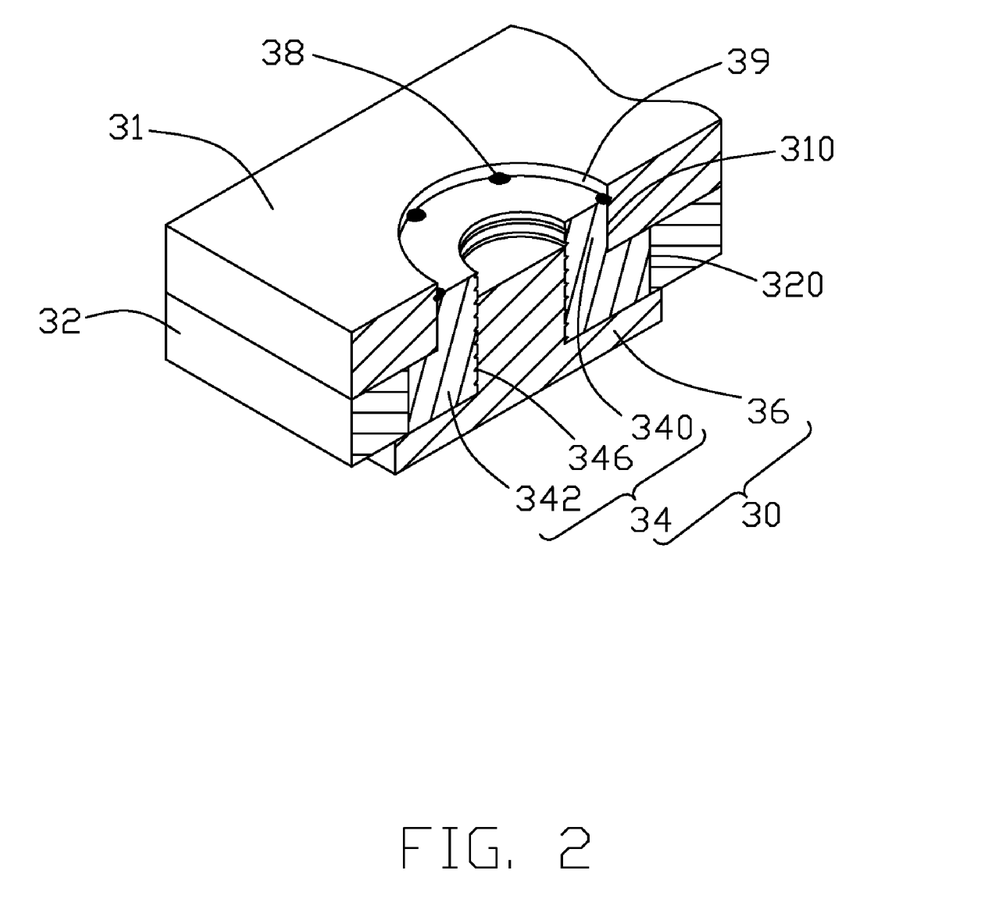
FIG. 2 is a side, cross-sectional view of the connecting structure of FIG. 1 connecting with the first metal element and the second metal element.

Referring to FIGS. 1 and 2, a connecting structure 30 in accordance with a first preferred embodiment is configured for clamping a first metal element 31 with a second metal element 32. A first through hole 310 is defined in the first metal element 31 and a second through hole 320 is defined in the second metal element 32. The connecting structure 30 includes a threaded weld bushing 34 and a fastener 36. The threaded weld bushing 34 includes a main body 340, a collar 342, and a fastener latching portion 346. A size and shape of the main body 340 corresponds to the first through hole 310 of the first element 31. A thickness of the main body 340 of the connecting structure 30 is less than a thickness of the first metal element 31. The collar 342 extends from one end of the main body 340. The main body of the threaded weld bushing 34 is inserted into the first through hole 310 of the first element 31 with the collar 342 abutting the first element 31. The first metal element 31 and the main body 340 of the connecting structure 30 cooperatively define a welding depression 39. The main body is then spot welded to the first metal element 31 by welding, thus creating a plurality of weld joints 38 in the welding depression 39.

In the first embodiment, the fastener 36 of the connecting structure 30 is a screw, and a threaded hole is defined in the fastener latching portion 346 for engaging with the fastener 36. The threaded hole extends from the main body 340 to the collar 342 of the connecting structure 30. The main body 340 and the collar 342 are both cylindrical. An exterior diameter of the main body 340 should be at least 0.3 millimeters less than that of the collar 342 so that the threaded weld bushing 34 can be reliably fixed to the first metal element 31. It can be understood that the threaded hole can only extend in the collar 342 of the connecting structure 30 and does not run through the main body 340 of the threaded weld bushing 34.

In addition, the weld joints 38 are created by laser welding. The thickness of the main body 340 of the connecting structure 30 is preferred to be about 0.05~0.15 millimeters less than the thickness of the first metal element 31.

An exemplary method for using the connecting structure 30 to connect the first metal element 31 and the second metal element 32 will now be described. The main body 340 of the connecting structure 30 is received in the first through hole 310 of the first metal element 31 with the collar 342 abutting the first metal element 31. The main body 340 of the connecting structure 30 is spot welded to the first metal element 31 with a plurality of weld joints 38. The weld joints 38 are formed on a top surface of the main body 340 of the connecting structure 30 and part of an inner surface of the first through hole of the first metal element 31. The collar 342 of the connecting structure 30 engages in the second through hole 320 of the second metal element 32. The collar 342 is preferred to abut a bottom surface of the first metal element 31. The fastener 36 engages with the fastener latching portion 346 of the connecting structure 30 so as to prevent the second metal element 32 detaching from the connecting structure 30.

Figure 3:
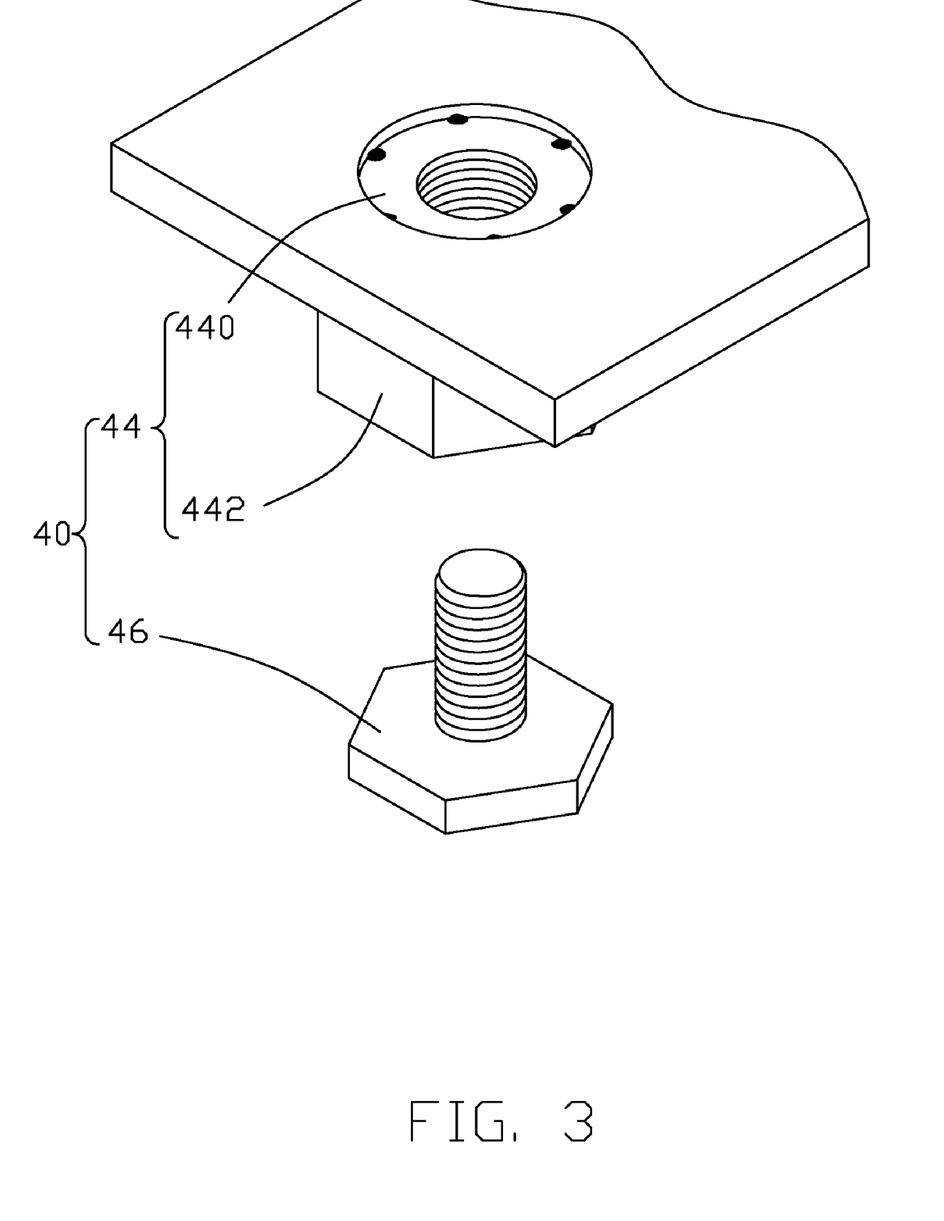
FIG. 3 is a partially exploded, isometric view of a connecting structure in accordance with a second preferred embodiment of the present invention.

Referring to FIG. 3, the principle of a connecting structure 40 in accordance with a second embodiment is similar to the connecting structure 30 in the first embodiment. The connecting structure 40 also includes a threaded weld bushing 44 and a fastener 46. The threaded weld bushing 44 includes a main body 440 and a collar 442. However, the collar 442 is a polygonal prism such as a hexagonal prism.

Figure 4:
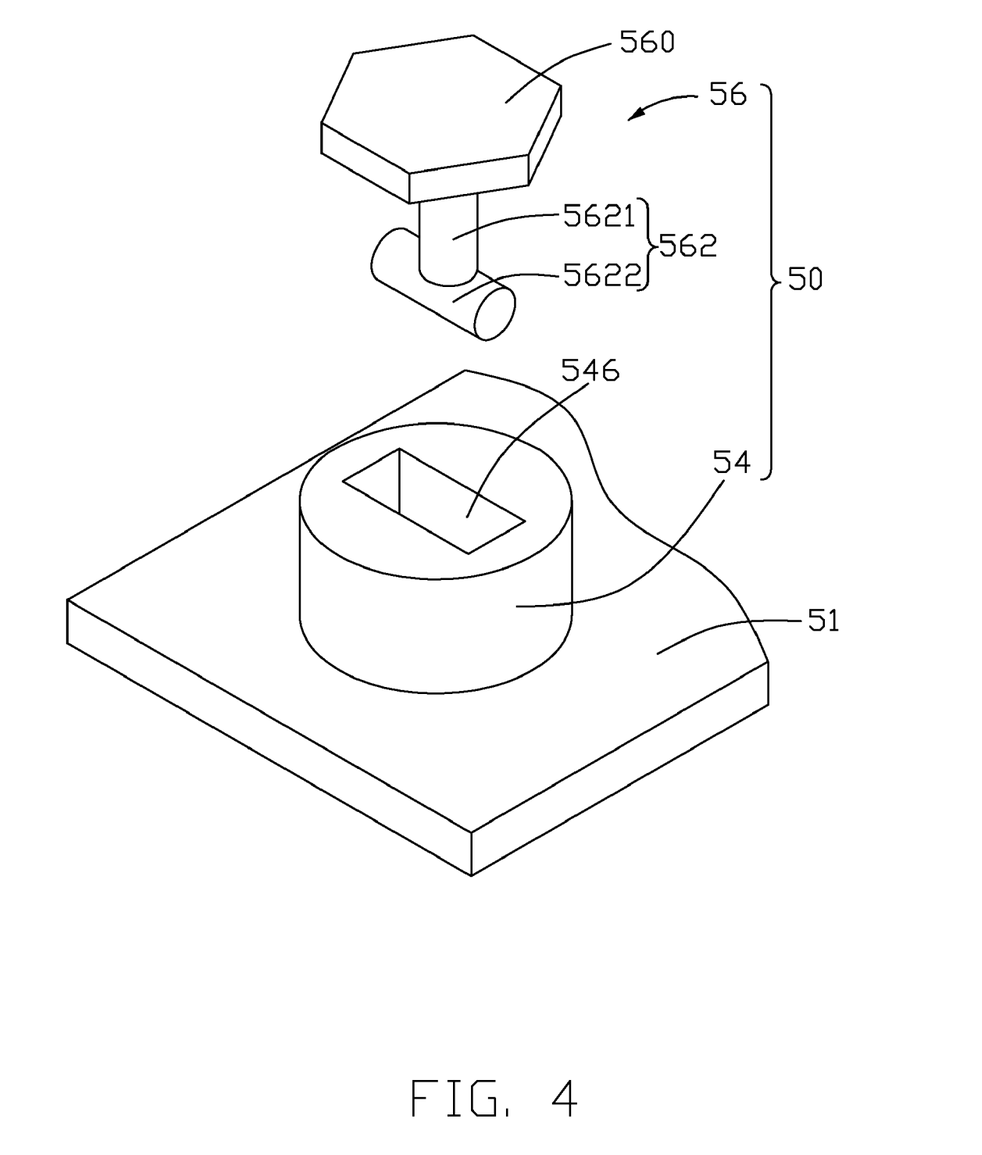
FIG. 4 is a partially exploded, isometric view of a connecting structure in accordance with a third preferred embodiment of the present invention.
Figure 5:
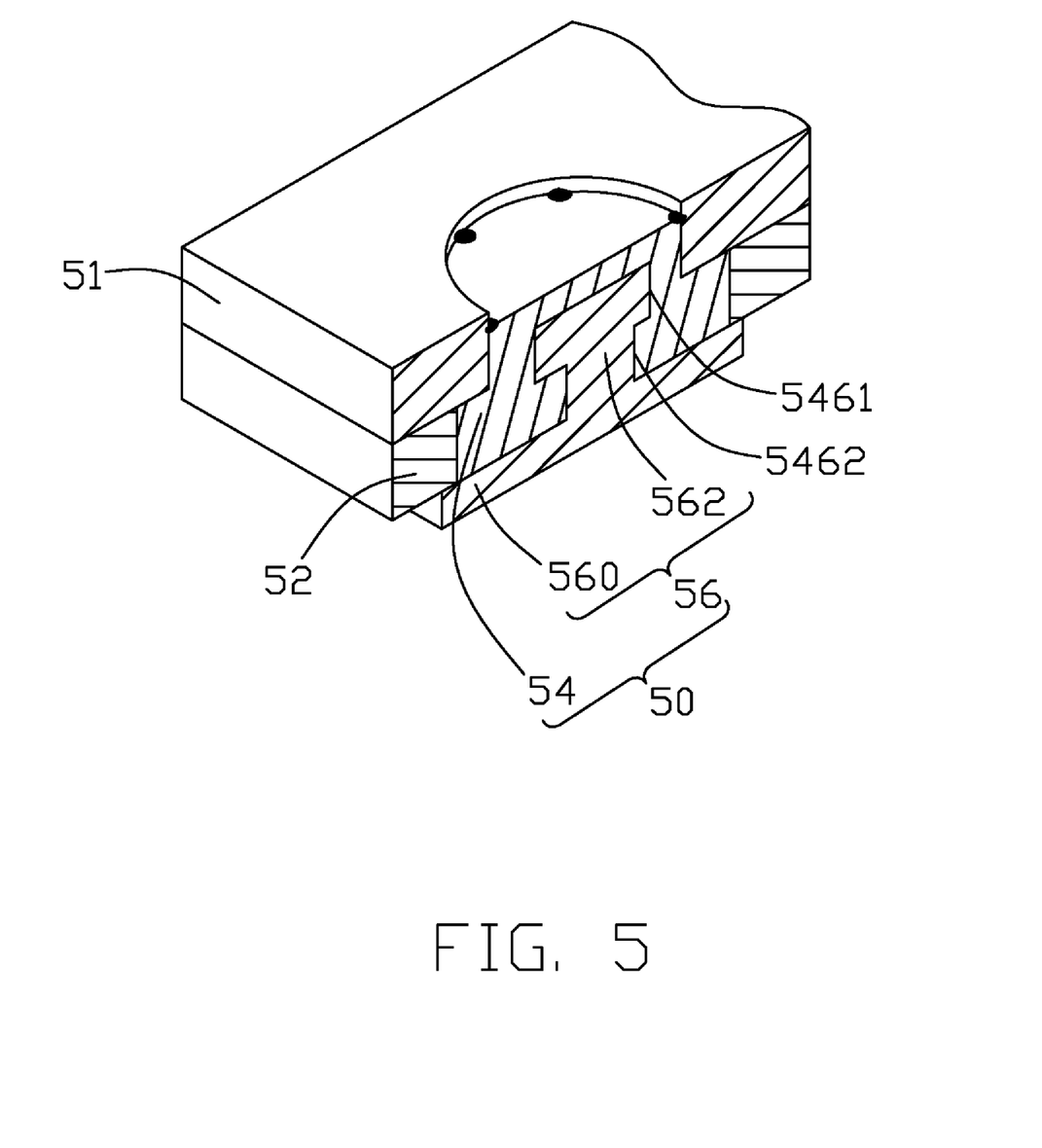
FIG. 5 is a side, assembled cross-sectional view of the connecting structure shown in FIG. 4.

Referring to FIGS. 4 and 5, a connecting structure 50 in accordance with a third preferred embodiment includes a threaded weld bushing 54 and a fastener 56. The threaded weld bushing 54 includes a fastener latching portion 546. A circular hole 5461 and a rectangular hole 5462 communicating with the circular hole 5461 are defined in the fastener latching portion 546. The fastener 56 is a key bolt including a base portion 560 and a T-shaped portion 562 extending from a bottom surface of the base portion 560. The T-shaped portion 562 includes a first cylinder 5621 perpendicularly extending from a middle of the base portion 560 and a second cylinder 5622 perpendicularly connecting to the first cylinder 5621. The first cylinder 5621 of the T-shaped portion 562 and the second cylinder 5622 of the T-shaped portion 562 have the same diameter. In use, one end of the threaded weld bushing 54 is melted to the first metal element 51 and another end of the threaded weld bushing 54 engages into the second metal element 52. The second cylinder 5622 of the T-shaped portion 562 extends through the rectangular hole 5462 of the fastener latching portion 546 and received in the circular hole 5461 of the fastener latching portion 546, then the fastener 56 is rotated about 90 degrees to prevent the second metal element 52 disengaging from the connecting structure 50.

Figure 6:
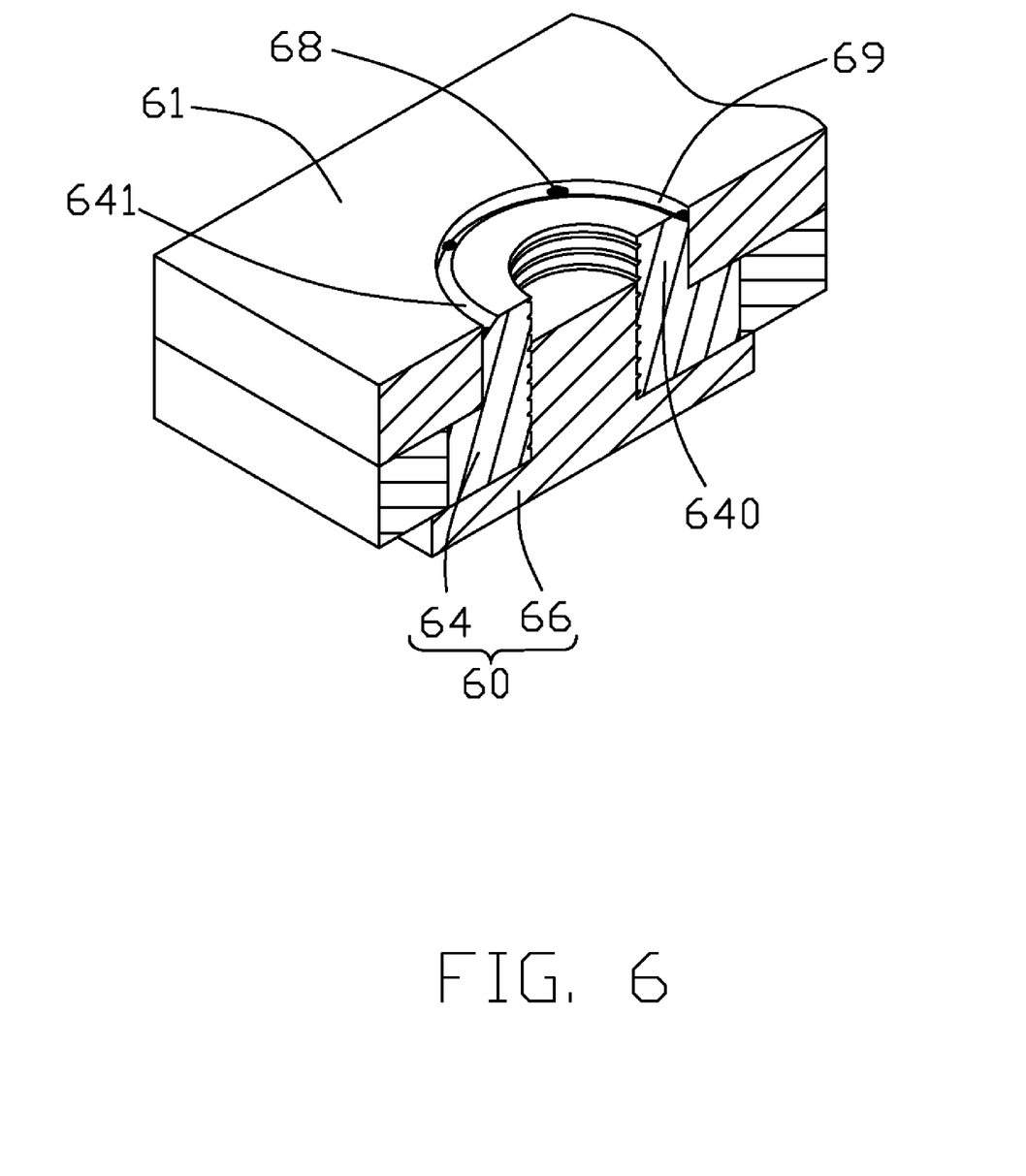
FIG. 6 is a side, assembled cross-sectional view of a connecting structure in accordance with a fourth preferred embodiment of the present invention.

Referring to FIG. 6, a connecting structure 60 in accordance with a fourth preferred embodiment is similar to the connecting structure 30 in the first embodiment. The connecting structure 50 includes a threaded weld bushing 64 and a fastener 66. However, a thickness of a main body 640 of the threaded weld bushing 64 is equal to a thickness of a first metal element 61. The main body 640 of the connecting structure includes a chamfer 641 formed on a circumferential fringe of a top end of the main body 640. Thus the chamfer 641 and the first metal element 61 cooperatively define a welding depression 69 for receiving a plurality of weld points 68. It can be understood that the connecting structure 641 can also formed on a circumferential fringe of a through hole defined in the first metal element 61.

Figure 7:
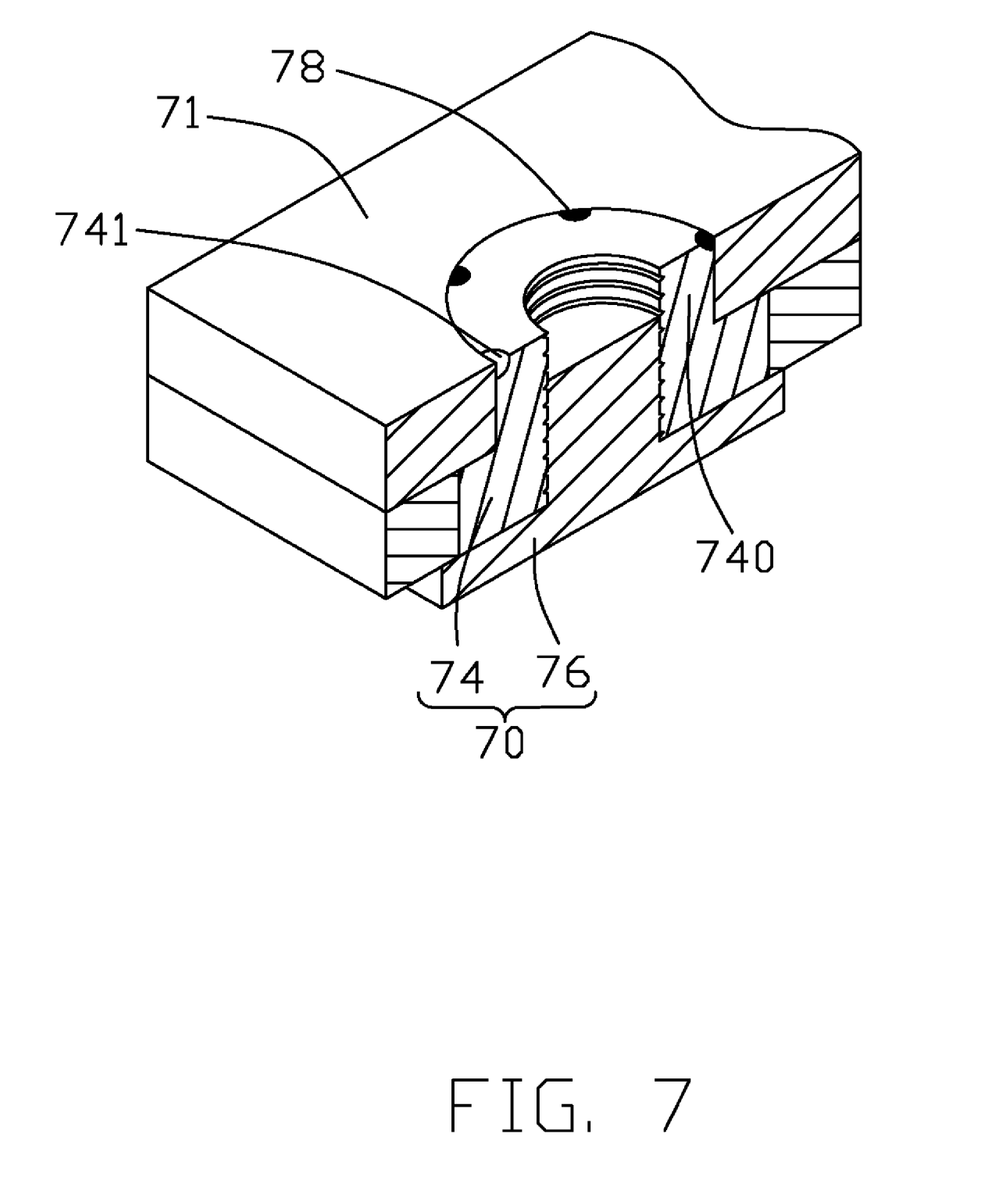
FIG. 7 is a side, assembled cross-sectional view of a connecting structure in accordance with a fifth preferred embodiment of the present invention.

Referring to FIG. 7, a connecting structure 70 in accordance with a fifth preferred embodiment is similar to the connecting structure 60 in the fourth embodiment. The connecting structure 70 includes a threaded weld bushing 74 and a fastener 76. However, a main body 740 of the threaded weld bushing 74 defines a plurality of receiving openings 741 in a circumferential fringe of a top end of the main body 740. The receiving openings 741 and the first metal element 71 cooperatively define a plurality of welding depressions for receiving a plurality of weld points 78.

As described above, because the connecting structure is connected to the first metal sheet by laser welding technology, thus a thickness of one of the first metal element and the second metal element can be less than 0.8 millimeters, and a hardness of the first metal element and a hardness of the second metal element can be both larger than 90 on the Rockwell Hardness B scale.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A connecting structure, comprising:
   a first metal element;
   a second metal element; and
   a threaded weld bushing, the threaded weld bushing including a main body welded to the first metal element with a plurality of weld joints, a collar extending from one end of the main body for abutting the first metal element and connecting to the second metal element, and a fastener latching portion defined in the main body and the collar; and
   a fastener for engaging with the fastener latching portion so as to prevent the second metal element detaching from the threaded weld bushing;
   wherein a thickness of one of the first metal element and the second metal element is less than 0.8 millimeters, and a hardness of the first metal element and a hardness of the second metal element are both larger than 90 on the Rockwell Hardness B scale, the weld joints are created by laser welding.

2. The connecting structure as claimed in claim 1, wherein a thickness of the main body of the connecting structure is less than a thickness of the first metal element.

3. The connecting structure as claimed in claim 2, wherein the thickness of the main body of the connecting structure is in a range from about 0.05 millimeters to about 0.15 millimeters less than the thickness of the first metal element.

4. The connecting structure as claimed in claim 1, wherein a first through hole is defined in the first metal element for engaging with the main body, and the first metal element and the main body cooperatively define a welding depression, and the weld joints are formed in the welding depression.

5. The connecting structure as claimed in claim 1, wherein the main body of the threaded weld bushing includes a chamfer formed on a circumferential fringe of a top end of the main body.

6. The connecting structure as claimed in claim 1, wherein the main body of the threaded weld bushing defines a plurality of receiving openings in a circumferential fringe of a top end of the main body.

7. The connecting structure as claimed in claim 1, wherein an exterior diameter of the main body is at least 0.3 millimeters less than that of the collar.

8. The connecting structure as claimed in claim 1, wherein the fastener is a screw, and a threaded hole is defined in the fastener latching portion for engaging with the fastener.

* * * * *